INVENTOR:
Fritz Beller
By: Michael S. Struker
agt.

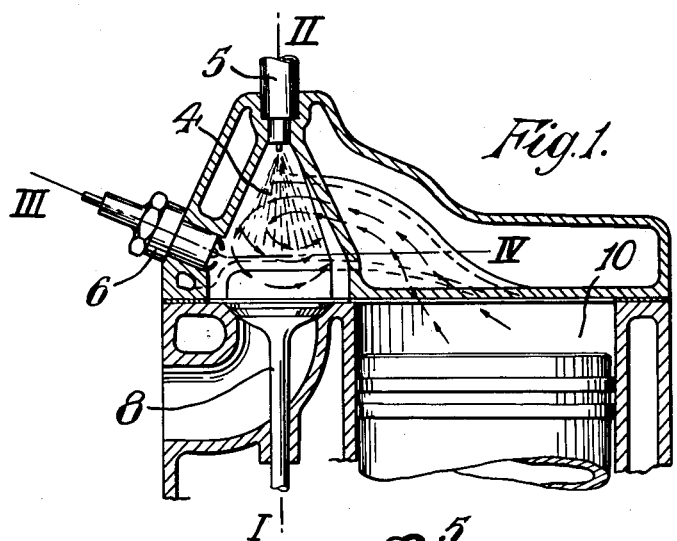
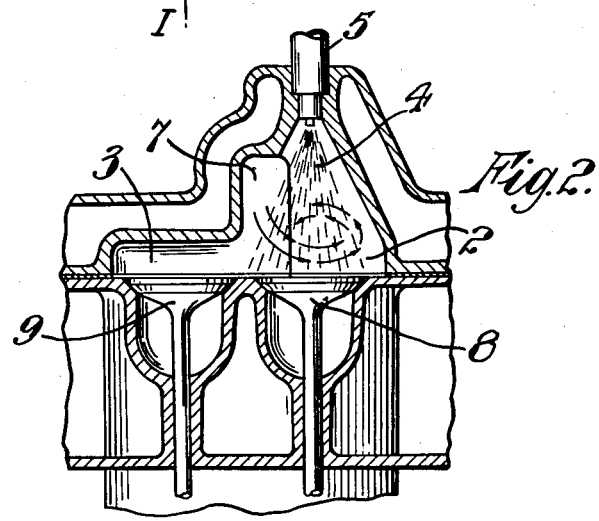
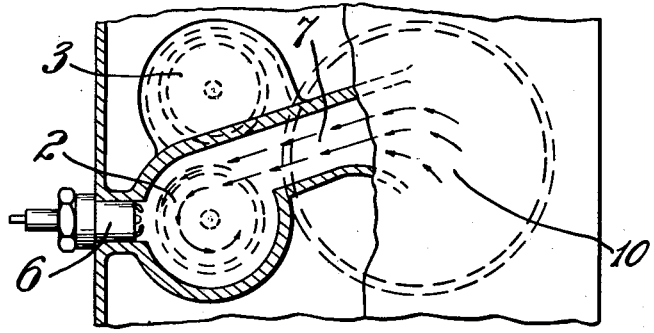

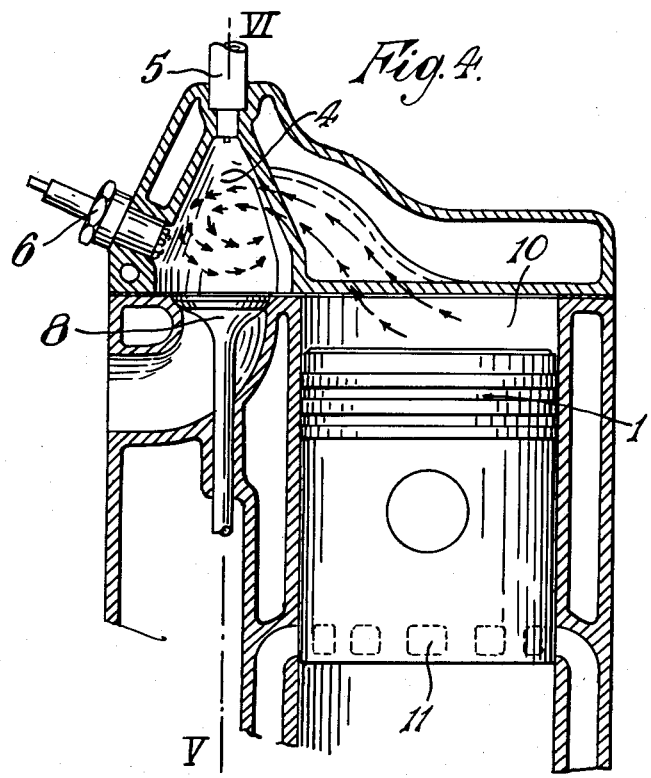
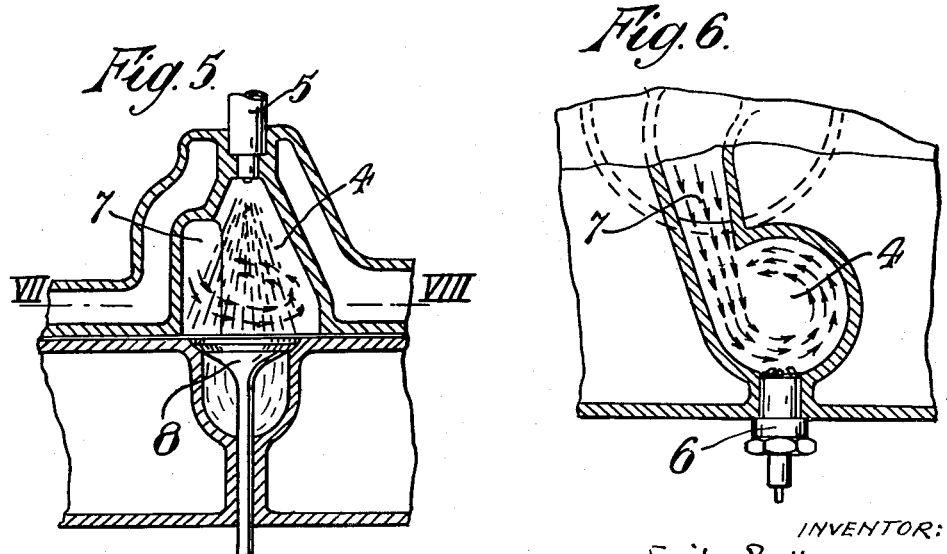

July 10, 1956 F. BELLER 2,753,852
HEAVY OIL INTERNAL COMBUSTION ENGINES
Filed Feb. 8, 1951 4 Sheets-Sheet 4

INVENTOR:
Fritz Beller
By: Michael S. Striker
agt.

United States Patent Office 2,753,852
Patented July 10, 1956

2,753,852
HEAVY OIL INTERNAL COMBUSTION ENGINES

Fritz Beller, Kassel-Wilhelmshohe, Germany

Application February 8, 1951, Serial No. 209,982
In Germany September 6, 1949

Public Law 619, August 23, 1954
Patent expires September 6, 1969

10 Claims. (Cl. 123—32)

This invention relates to two-stroke or four-stroke side or overhead valve internal combustion engines with fuel spark injection and ignition in a compression and combustion space externally of the cylinder.

In the development of internal combustion engines of this kind, which are known as medium pressure engines, it has been realised that a high degree of turbulence of the atomised fuel and air mixture is an essential pre-requisite to good combustion.

Attempts have hitherto been made to attain this by special shaping of the inlet passage and screening of the air inlet valve in such manner that the air stream enters the cylinder tangentially and follows the descending piston during the suction stroke in the form of a helical eddy. Particularly at low speeds, however, this eddy is practically brought to a standstill by internal friction and also by friction against the cylinder wall, and therefore the desired turbulent action is achieved only to a very small extent. Moreover, due to the inevitable throttling at the screening of the inlet valve, the rate of charging is unfavourably influenced.

It is an object of the present invention to obviate the foregoing disadvantages and to provide means for obtaining an air eddy or turbulence which will result in the formation of an ignitable mixture with absolute dependability. This feature is particularly necessary in two-stroke engines, since the scavenging period is of very short duration and the removal of the exhaust gases must also take place during this short period.

To this end, according to the present invention, the compression and combustion space is subdivided into two chambers, namely into an eddy or vortex chamber and a chamber lying above the swept space of the cylinder, both chambers being interconnected by a passage, which leads tangentially into each of the two chambers. The invention is equally suitable for two- or four-stroke engines with either side or overhead valves.

Referring first to engines having side valves, it has already been proposed to arrange the air inlet passage in the cylinder head in such a way, and to screen the inlet valve on one side in such manner, that a rotation around the axis of the cylinder is imparted to the air on entering the working cylinder. This rotation is intended to be maintained despite the break-up of the original annular eddy to a long helical eddy at the end of the suction stroke and the reconversion of this helical eddy into an annular eddy during the compression stroke, but in practice this is not possible, except with considerable losses of energy, on account of internal friction of the flowing medium and friction between the walls of the engine and the flowing medium.

It is therefore more advantageous to produce the eddying only during the compression stroke, i. e., to use as injection space an eddy chamber connected to the swept space of the cylinder by a tangentially entering passage. Special protective means for the inlet valve, for example, a valve screen, which only unfavourably affect the rate of charging due to its throttle action, can then be entirely dispensed with.

An engine with the above mentioned valve arrangement is certainly convenient from the point of view of control technique, but raises difficult structural problems for the shaping of the compression and combustion chamber, when in addition to the subdivision of the compression and combustion chamber into a flat valve space or pocket lying to the side of the swept space there is also an eddy or vortex chamber. It is a feature of the present invention to provide for a favourable solution both of this problem of space and of the problem of complete mixture formation.

According to a feature of the invention, a conical injection and eddy chamber is provided, at the apex of which is disposed the fuel injection nozzle, against the outer surface of which tangentially enters a passage connecting said chamber with the swept space of the working cylinder, and the open base surface of which merges directly into the valve pocket or space. The spark plug is disposed on the conical surface of the eddy chamber, approximately opposite the entry of the passage.

In further development of the invention, the eddy chamber, designed in the form of a circular cone, may lie coaxially with the exhaust valve, so that a flat pocket remains only above the inlet valve.

Referring now to engines having overhead valves, in accordance with a further feature of the invention, the passage leading from the interior chamber constituting a direct continuation of the swept space, into the throttled eddy or vortex chamber is directed towards the spark plug disposed in the outer chamber wall, and behind which the injection nozzle discharges in the direction of the incoming air. A part of the eddy or vortex chamber wall lying approximately opposite the nozzle may if desired directly face the exhaust branch in the cylinder head, i. e. without any water cooling jacket, while the other parts of the wall of the eddy or vortex chamber are water-cooled.

In order that the invention may be more readily understood, reference is made to the accompanying drawings which illustrate diagrammatically and by way of example, several embodiments thereof and in which:

Fig. 1 is a longitudinal section through the upper part of the engine cylinder and the eddy chamber of a four-stroke engine having side valves;

Fig. 2 is a section along the line I—II of Fig. 1;

Figure 7:
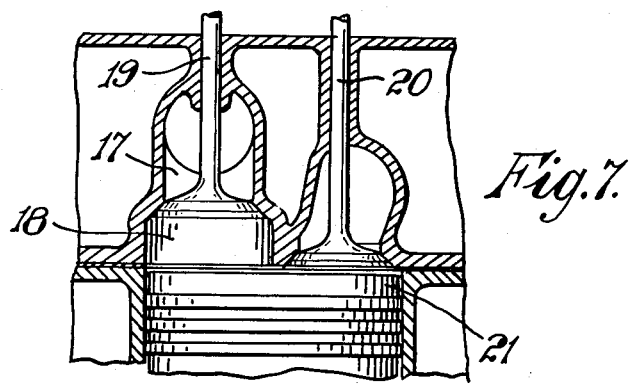
Figure 9:
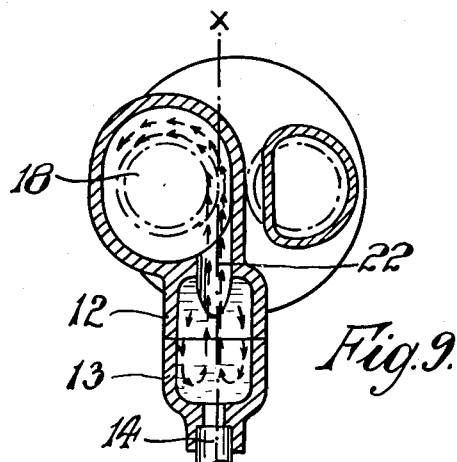
Figure 8:
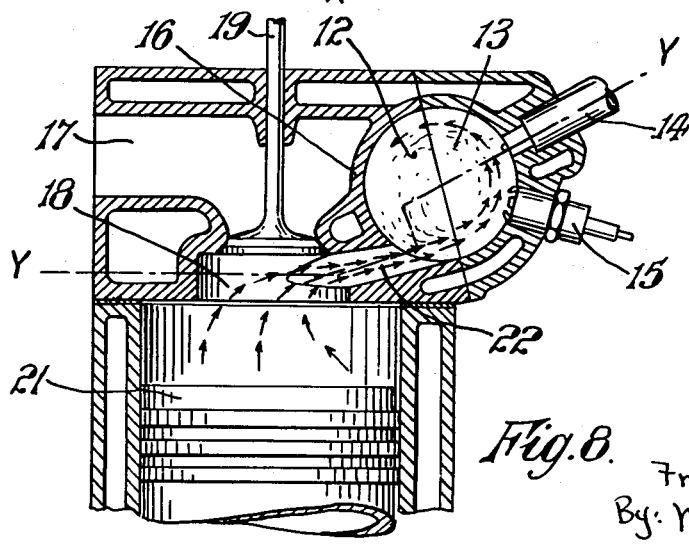
Figure 10:
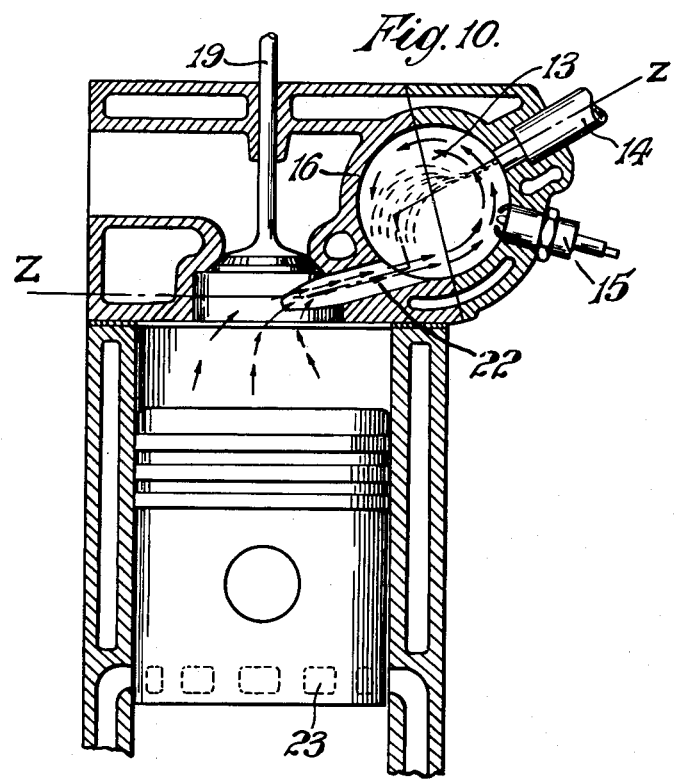
Figure 11:
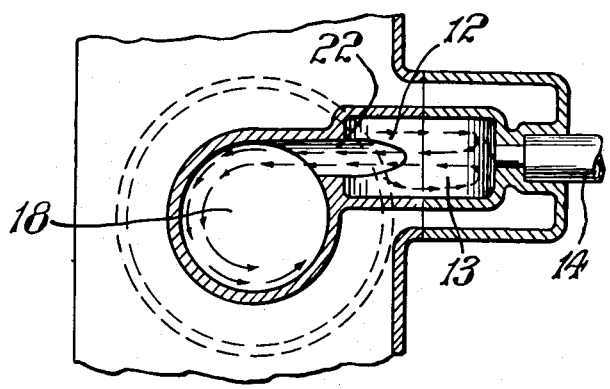

Fig. 3 a section along the line III—IV of Fig. 1;

Fig. 4 is a longitudinal section through another embodiment, similar to that of Fig. 1 but for a two-stroke engine;

Fig. 5 a section along the line V—VI of Fig. 4;

Fig. 6 a section along the line VII—VIII of Fig. 5;

Fig. 7 is a longitudinal section through the upper part of a cylinder with the piston in the top dead centre position of a third embodiment showing a four-stroke engine having overhead valves;

Fig. 8 is a longitudinal section along the line $x$—$x$ of Fig. 9;

Fig. 9 is a cross-section through the cylinder head along the line $y$—$y$ of Fig. 8;

Fig. 10 is a longitudinal section of another embodiment similar to Fig. 7 but for a two-stroke engine; and Fig. 11 is a cross-section along the line $z$—$z$ of Fig. 10.

In the drawings, like reference characters have been used to denote like parts in the embodiments of Figs. 1 to 3 and 4 to 6, respectively and other like reference characters for like parts in the embodiments of Figs. 7 to 9 and 10 and 11, respectively.

In the embodiments of Figures 1 to 6, 1 denotes a working piston, 2 an exhaust valve pocket, 3 an inlet valve pocket, 4 an eddy or vortex chamber, 5 an injection nozzle, 6 a spark plug, 7 an overflow passage, 8 an exhaust valve, 9 an inlet valve, and 10 a working cylinder, at the bottom part of which, in the two-stroke engine illustrated in Figs. 4 to 6, the piston-controlled scavenging slots 11 are provided.

During the compression stroke the major part of the load air of the working piston 1, as indicated by arrows, is displaced out of the cylinder 10 through the passage 7 into the conical eddy or vortex chamber 4. Due to the tangential entry of the passage 7 into the conical chamber 4, the air performs therein a vigorous eddy movement around the axis of the chamber. At approximately the maximum speed of the piston during the compression stroke, i. e., during the greatest turbulence, the fuel is injected from the nozzle 5. The conical shape of the chamber is conveniently adapted to the shape of the jet. The fuel is intensely swirled with the air in circular motion. The spark plug 6 however, being continously and intensely blown on by the air emerging from the mouth of the passage 7, lying substantially opposite to it, is kept free from droplets of fuel and is cooled.

After ignition and the rise in pressure in the chamber 4, the direction of flow of the now burning mixture reverses, the mixture passes over into the cylinder space 10, which, if desired, may be more or less stepped in relation to the main portion of the cylinder or may lie eccentrically in relation to the axis of the cylinder.

The amount of air present in the space 3 above the inlet valve 9 and not directly mixed with the atomized fuel likewise flows back into the working space 10 and helps to maintain the combustion.

An arrangement of the chamber 4 directly above the exhaust valve 8 and its pocket 2 has the advantage to ensure the ignition of the fuel even in the event of the cooling of the engine through running for a long time under low load, since the fuel is sprayed on the hot valve head.

In two-stroke engines, as illustrated in Figs. 4 to 6, the construction is simplified by the elimination of the inlet valve. The arrangement of the chamber 4 directly above and as a continuation of the pocket 2 above the outlet valve 8 also brings here the particular advantage that the current of scavenging air flows out of the cylinder space 10 through the passage 7 and chamber 4 to the outlet, so that these are also scavenged during each cycle.

Another embodiment is shown in Figs. 7 to 9 of the drawings, and in Fig. 8 the working piston 21 is illustrated during the compression stroke. A stepped inner space 18 (see particularly Fig. 9) has the shape of a low, approximately elliptical cylinder. The eddy or vortex chamber is of cylindrical shape and consists of an inner bowl 12 and an outer bowl 13 placed thereagainst. Into the wall of the outer bowl 13 are screwed the injection nozzle 14 and the spark plug 15. The wall of the vortex chamber is surrounded by a water jacket, except for a section 16 lying substantially opposite the nozzle 14 and closing the chamber directly against the exhaust branch 17 in the cylinder head.

The inner space 18, see Fig. 9, is disposed to the side of the main cylinder and has a wall portion substantially normal to the top wall of the cylinder and the outlet valve 19 seating in its top closure surface. The inlet valve, Fig. 7, is designated by 20, the working piston by 21, and the passage interconnecting and leading tangentially into the spaces 12 and 18 by 22.

The effects of this arrangement are as follows:

During the compression stroke, in consequence of the sharp deflection at the edges between the space 18 and the cylinder, and also at the overflow passage 22, the loading air is already swirled and enters in that condition the chamber 12, 13, where in consequence of the shape of the chamber it performs a rotation in the direction of the arrows shown. The intensity of these movements increases up to the maximum piston speed, which occurs shortly after the middle of the stroke, when the injection approximately commences.

The spark plug 15, which sparks approximately at the end of the stroke and which lies opposite the mouth of the passage 22, is constantly blown free of any droplets of fuel flying on to it and after sparking is protected against overheating by the vigorous flow.

The increase in pressure entailed by the combustion in the chamber 12, 13 effects a reversal of the direction of rotation of the eddy. The burning charge passing tangentially out of 12, 13 now passes, likewise tangentially, into the partial space 18 and within that space produces likewise a vigorous rotary movement (Fig. 9). Thus during and after the injection a very thorough mixing of air and fuel takes place within the chamber 12, 13, and after ignition complete combustion takes place both in the chamber 12, 13 and in the space 18, because the air is completely utilised in both spaces for combustion in consequence of the vigorous flow movements.

The hot stream of exhaust gases sweeps the wall part 16 of the vortex chamber and thereby facilitates warming-up the engine after starting and ensures ignition even when the engine has cooled (for example after idling for long periods). The wall part 16 acts as a heat storage means, it is heated more quickly than the water-cooled wall parts of the vortex chamber, but cools more slowly than the latter. It thus assists in regulating the heat state of the chamber on repeated changes of load. The fuel which is injected on to the wall part 16 from the nozzle 14 evaporates in consequence of the heat stored there, and is thereby more easily ignited.

The embodiment for two-stroke engines illustrated in Figs. 10 and 11, is similar to the previously described embodiment except for the omission of the inlet valve and the addition of piston-controlled inlet slots 23 for the scavenging and charging air.

The effects of this construction are similar to those of the previous embodiment for four-stroke engines.

I claim:

1. A medium pressure internal combustion engine of the class described having a compression and combustion space externally of the engine cylinder, means for injecting fuel into said space during a compression stroke and a spark plug for igniting said fuel towards the end of said stroke, characterized by said compression and combustion space being subdivided into two chambers constituting a vortex chamber and a chamber situated directly above said cylinder, and passage means, interconnecting said chambers, leading tangentially into each of said two chambers the spark plug being arranged in said vortex chamber and opposite the mouth of said passage so as to be swept by gases issuing therefrom.

2. A medium pressure internal combustion engine of the class described having side valves, a compression and combustion space externally of the engine cylinder, means for injecting fuel into said space during a compression stroke and a spark plug for igniting said fuel towards the end of said stroke, characterized by said compression and combustion space being subdivided into two chambers constituting a vortex chamber of conical shape and a chamber situated directly above said cylinder, said fuel injection means being disposed in the apex of said conical chamber, passage means, interconnecting said chambers, leading tangentially into each of said two chambers, one end of said passage means entering through the side of said conical chamber, and the spark plug being arranged in said conical chamber and opposite the mouth of said passage so as to be swept by gases issuing therefrom, a flat exhaust valve pocket merging directly into the base of said conical chamber and an exhaust valve in said pocket.

3. Medium pressure internal combustion engine as claimed in claim 2, wherein said conical chamber is of circular cross-section and is coaxial with said exhaust valve.

4. Medium pressure internal combustion engine as claimed in claim 2 for two-stroke operation, which further includes piston-controlled scavenging slots in the wall of said cylinder and said mechanically controlled exhaust valve coaxially arranged beneath said conical chamber.

5. A medium pressure internal combustion engine of the class described having overhead valves, a compression and combustion space externally of the engine cylinder, means for injecting fuel into said space during a compression stroke and a spark plug for igniting said fuel towards the end of said stroke, characterized by said compression and combustion space being subdivided into two chambers constituting a vortex chamber and a chamber situated directly above said cylinder, said last-mentioned chamber being stepped-down abruptly in diameter in relation to said cylinder, and passage means, interconnecting said chambers, leading tangentially into each of said two chambers, the spark plug being arranged in said vortex chamber and opposite the mouth of said passage so as to be swept by gases issuing therefrom.

6. Medium pressure internal combustion engine as claimed in claim 5, wherein said second-mentioned chamber is disposed beneath the exhaust valve.

7. Medium pressure internal combustion engine as claimed in claim 5, for two-stroke operation, which further includes piston-controlled scavenging slots in the wall of said cylinder and a mechanically controlled exhaust valve disposed above said stepped-down space.

8. A medium pressure internal combustion engine of the class described having overhead valves, a compression and combustion space externally of the engine cylinder, means for injecting fuel into said space during a compression stroke and a spark plug for igniting said fuel towards the end of said stroke, characterized by said compression and combustion space being subdivided into two chambers constituting a vortex chamber and a chamber situated directly above said cylinder and stepped down abruptly in diameter in relation to said cylinder, and passage means, interconnecting said chambers, leading tangentially into each of said two chambers, a straight line extending through said passage means into said vortex chamber intersecting said spark plug, the latter being disposed in an outer wall of the said chamber, and said fuel injection means discharging to the rear of said spark plug in the direction of flow.

9. Medium pressure internal combustion engine as claimed in claim 8, which further includes an exhaust branch, and a water cooling jacket, a part of the wall of said vortex chamber approximately opposite said fuel injection means backing directly on to said exhaust branch while the remaining part of said wall is cooled by said jacket.

10. In a medium pressure engine, in combination, a cylinder; wall means located over said cylinder and defining a pair of substantially identical and substantially cylindrical vortex chambers respectively having mutually perpendicular axes, and said wall means being formed with a passage providing communication between said vortex chambers and leading tangentially into both of said chambers, one of said chambers communicating with said cylinder; and fuel injection means and ignition means carried by said wall means and communicating with the interior of the other of said chambers.

References Cited in the file of this patent

UNITED STATES PATENTS

| | | |
|---|---|---|
| 2,120,768 | Ricardo | June 14, 1938 |
| 2,191,042 | Ricardo | Feb. 20, 1940 |

FOREIGN PATENTS

| | | |
|---|---|---|
| 89,285 | Sweden | Mar. 19, 1937 |
| 102,667 | Sweden | Sept. 30, 1941 |
| 625,946 | Great Britain | July 6, 1949 |